United States Patent
Newcomb et al.

(10) Patent No.: US 10,436,307 B2
(45) Date of Patent: Oct. 8, 2019

(54) COMPOSITE AXLE HOUSING AND METHODS OF MANUFACTURING THEREOF

(71) Applicant: GM Global Technology Operations LLC, Detroit, MI (US)

(72) Inventors: Bradley A. Newcomb, Troy, MI (US); Hamid G. Kia, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 193 days.

(21) Appl. No.: 15/443,341

(22) Filed: Feb. 27, 2017

(65) Prior Publication Data

US 2018/0245681 A1    Aug. 30, 2018

(51) Int. Cl.
  *F16H 57/037* (2012.01)
  *B29C 70/32* (2006.01)
  (Continued)

(52) U.S. Cl.
  CPC ............ *F16H 57/037* (2013.01); *B23P 15/00* (2013.01); *B29C 33/3842* (2013.01);
  (Continued)

(58) Field of Classification Search
  CPC . B29C 70/086; B29C 70/386; B29C 33/3842; B29C 70/32; F16H 57/028;
  (Continued)

(56) References Cited

U.S. PATENT DOCUMENTS 7,819,462 B1    10/2010 Owens
8,033,592 B2    10/2011 Hsu et al.
(Continued)

FOREIGN PATENT DOCUMENTS

CN    108506455 A    9/2018
DE    102018104019 A1    8/2018

OTHER PUBLICATIONS

Bryan Ellis, Ray Smith, Polymers: a property database, Oct. 29, 2008, 2nd edition, 1210 pages (Year: 2008).*
(Continued)

*Primary Examiner* — Jacob S. Scott
*Assistant Examiner* — Lillian T Nguyen
(74) *Attorney, Agent, or Firm* — Harness, Dickey & Pierce, P.L.C.

(57) ABSTRACT

An axle housing for a vehicle is provided. The axle housing includes a polymeric composite body. The polymeric composite body includes a polymer and a plurality of reinforcing fibers. The polymeric composite body has a modulus of greater than or equal to about 10 GPa. The polymeric composite body defines an inner surface and at least one bearing region. The inner surface defines an interior cavity. The interior cavity is configured to receive an internal gear set including a bearing. The at least one bearing region includes a bore. The at least one bearing region is configured to be disposed around the bearing of the internal gear set. The axle housing may unibody, such that a body portion is free of joints or seams, or it may include multiple pieces. Methods of manufacturing composite axle housings are also provided.

17 Claims, 7 Drawing Sheets

Figure 1A:
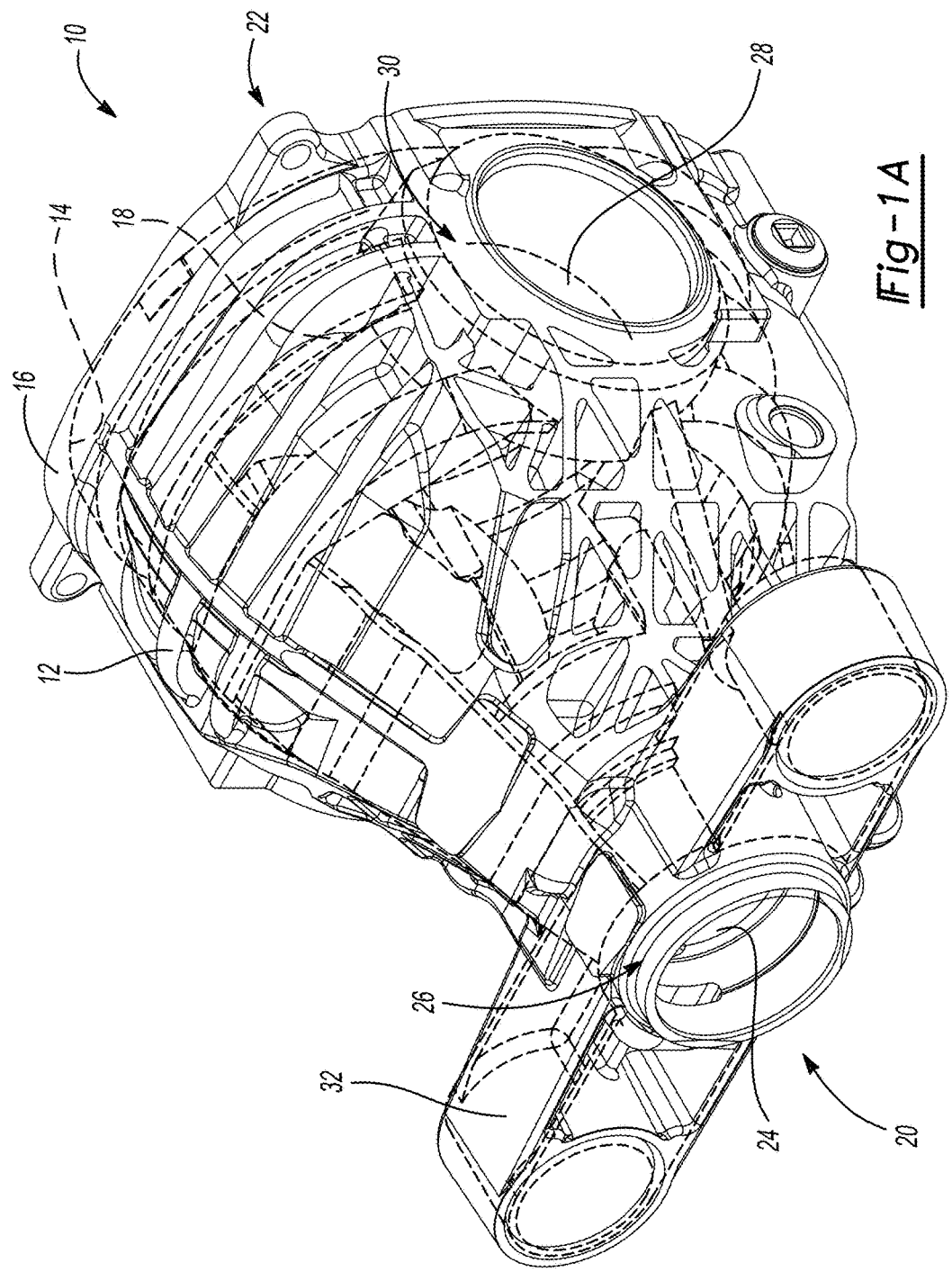

(51) Int. Cl.
| | |
|---|---|
| *B33Y 10/00* | (2015.01) |
| *B33Y 80/00* | (2015.01) |
| *B23P 15/00* | (2006.01) |
| *B29C 33/38* | (2006.01) |
| *B29C 70/38* | (2006.01) |
| *F16H 57/028* | (2012.01) |
| *F16H 57/029* | (2012.01) |
| *F16H 57/031* | (2012.01) |
| *B29C 70/08* | (2006.01) |
| *B29K 105/08* | (2006.01) |
| *B29K 307/04* | (2006.01) |
| *B29L 22/00* | (2006.01) |
| *B29L 31/30* | (2006.01) |
| *F16H 48/08* | (2006.01) |

(52) U.S. Cl.
CPC ......... *B29C 70/086* (2013.01); *B29C 70/32* (2013.01); *B29C 70/386* (2013.01); *B33Y 10/00* (2014.12); *B33Y 80/00* (2014.12); *F16H 57/028* (2013.01); *F16H 57/029* (2013.01); *F16H 57/031* (2013.01); *B23P 2700/50* (2013.01); *B29K 2105/0872* (2013.01); *B29K 2307/04* (2013.01); *B29L 2022/00* (2013.01); *B29L 2031/30* (2013.01); *F16H 48/08* (2013.01)

(58) Field of Classification Search
CPC ...... F16H 57/031; F16H 48/08; F16H 57/029; F16H 57/037; F16H 57/032; B23P 15/00; B23P 2700/50; B33Y 10/00; B33Y 80/00; B29K 2105/0872; B29K 2307/04; B29L 2031/30; B29L 2022/00
See application file for complete search history.

(56) References Cited

U.S. PATENT DOCUMENTS

| | | | |
|---|---|---|---|
| 8,109,174 B2* | 2/2012 | Hilker | F16H 57/0421 184/6.12 |
| 8,109,492 B2 | 2/2012 | Winocur | |
| 8,961,724 B2 | 2/2015 | Polewarczyk et al. | |
| 9,227,673 B2 | 1/2016 | Berger et al. | |
| 10,125,809 B2 | 11/2018 | Coppola et al. | |
| 10,132,270 B2 | 11/2018 | Coppola et al. | |
| 2003/0012976 A1* | 1/2003 | Crocco | B22D 19/14 428/614 |
| 2014/0073471 A1* | 3/2014 | Whyte | F16H 57/031 475/220 |
| 2015/0330446 A1* | 11/2015 | Kia | F16C 33/30 428/172 |
| 2016/0264082 A1 | 9/2016 | Berger et al. | |
| 2017/0314668 A1* | 11/2017 | Kia | B29C 65/48 |
| 2018/0029316 A1 | 2/2018 | Coppola et al. | |
| 2018/0030922 A1 | 2/2018 | Kia et al. | |
| 2018/0030924 A1 | 2/2018 | Coppola et al. | |

OTHER PUBLICATIONS

Hamid G. Kia et al.; U.S. Appl. No. 15/225,025, filed Aug. 1, 2016 entitled "Polymeric Composite Engine Assembly and Methods of Heating and Cooling Said Assembly"; 42 pages.

Anthony M. Coppola et al.; U.S. Appl. No. 15/225,037, filed Aug. 1, 2016 entitled "Methods of Manufacturing Vehicle Assemblies"; 52 pages.

Anthony M. Coppola et al.; U.S. Appl. No. 15/225,051, filed Aug. 1, 2016 entitled "Methods of Joining Components in Vehicle Assemblies"; 55 pages.

Anthony M. Coppola et al.; U.S. Appl. No. 15/225,066, filed Aug. 1, 2016 entitled "Engine Assemblies and Methods of Manufacturing Same"; 47 pages.

Anthony M. Coppola et al.; U.S. Appl. No. 15/225,080, filed Aug. 1, 2016 entitled "Crankshaft Assemblies and Methods of Manufacturing the Same"; 52 pages.

* cited by examiner

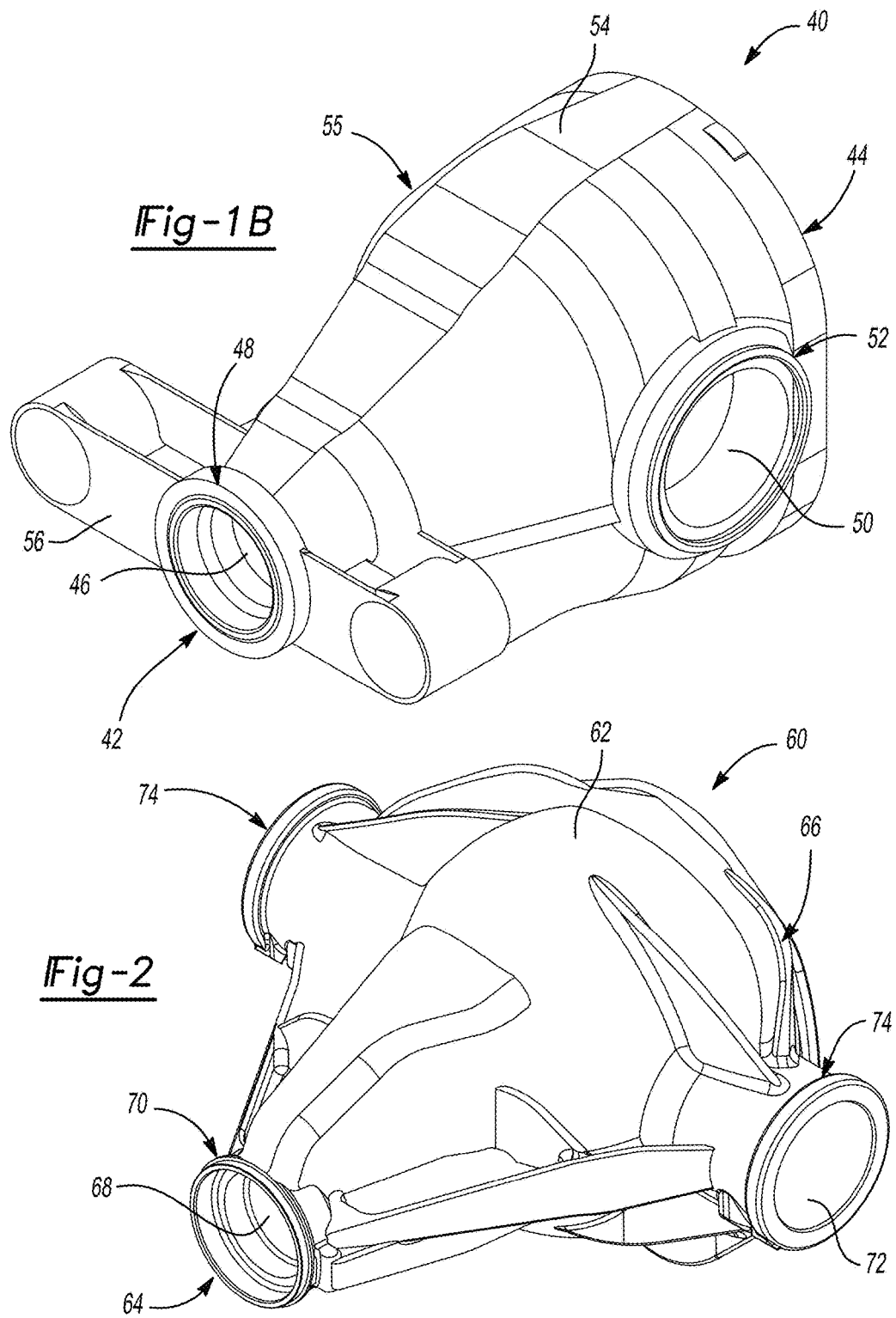

COMPOSITE AXLE HOUSING AND METHODS OF MANUFACTURING THEREOF

INTRODUCTION

This section provides background information related to the present disclosure which is not necessarily prior art.

Axle housing assemblies for vehicles may include an internal gear set, a two-piece metal housing, and axle tubes. The internal gear set may include a differential gear set, a ring gear, a pinion gear, pinion bearings, and side bearing. The internal gear set is disposed inside the two-piece axle housing. The two-piece axle housing may be formed from a metal, such as aluminum or steel, and it includes a center section, a cap, and a gasket disposed between the main body and the cap to provide a liquid seal and reduce noise, vibration, and harshness ("NVH"). The axle tubes are joined to the axle housing. The axle tubes may be pressed into bores in the axle housing, welded to the axle housing, or otherwise joined to the axle housing.

The two-piece design of the axle housing permits access to the internal gear set when the cap is removed from the main body. The internal gear set is accessed to install the gear set, aligning gears, set gear preloads, and replace the internal gear set. Shims or spacers may be used during alignment and preloading to achieve efficient gear operation. However, it would be desirable to form a lightweight axle housing to improve performance efficiency.

SUMMARY

This section provides a general summary of the disclosure, and is not a comprehensive disclosure of its full scope or all of its features.

The present disclosure relates to composite axle housings for vehicles and methods of manufacturing thereof.

In certain aspects, the present disclosure provides an axle housing for a vehicle. The axle housing includes a polymeric composite body. The polymeric composite body includes a polymer and a plurality of reinforcing fibers. The polymeric composite body has a modulus of greater than or equal to about 10 GPa. The polymeric composite body defines an inner surface and at least one bearing region. The inner surface defines an interior cavity. The interior cavity is configured to receive an internal gear set including a bearing. The at least one bearing region includes a bore. The at least one bearing region is configured to be disposed around the bearing of the internal gear set.

In some embodiments, the polymeric composite body has a coefficient of thermal expansion of less than or equal to about $14\times10^{-6}/°$ C. at the at least one bearing region.

In certain other embodiments, the axle housing further includes a liner disposed adjacent to at least a portion of the inner surface of the polymeric composite body.

In some embodiments, the liner includes a metal selected from the group consisting of aluminum (Al), magnesium (Mg), iron (Fe), steel, and combinations thereof.

In certain embodiments, the liner includes a first thickness at the at least one bearing region and a second thickness in a connecting region. The first thickness is greater than the second thickness.

In certain other embodiments, the polymeric composite body defines a unitary structure free of seams or joints.

In still other embodiments, the polymeric composite body includes a center section, a gasket, and a cover. The center section includes a perimeter defining a differential opening. The gasket is disposed around the perimeter. The cover engages the gasket to enclose the axle housing and create a liquid seal.

In some embodiments, the axle housing is a Salisbury axle housing.

In other aspects, an axle housing for an vehicle includes an internal gear set, an axle housing, and axle tubes The internal gear set includes a differential gear set, a pinion gear and pinion bearing, a side bearing, and a ring gear. The axle housing includes a polymeric composite body. The polymeric composite body includes a polymer and a plurality of reinforcing fibers. The polymeric composite body defines an inner surface defining an inner cavity and at least one bearing region having a bore. The internal cavity retains the internal gear set. The axle tubes are attached to or integrally formed with the axle housing.

In certain variations, a gap is defined between an inner surface of the axle housing and an outer surface of the internal gear set. The gap is greater than or equal to about 0.5 mm to less than or equal to about 25 mm.

In other variations, the polymeric composite body includes at least one bearing region having a bore configured to be disposed around a bearing of the internal gear set. The axle housing further includes a liner disposed around at least a portion of a surface of the at least one bearing region.

In still other aspects, the present disclosure provides a method of manufacturing an axle housing assembly for a vehicle. The method includes creating a liner having an inner surface configured to receive an internal gear set of a vehicle and an outer surface. The method also includes creating a body precursor disposed around at least a portion of the outer surface of the liner. The body precursor includes a polymer precursor and a plurality of reinforcing fibers. The method further includes cross-linking or solidifying the body precursor to form a composite axle housing. The composite axle housing includes a polymer and the plurality of reinforcing fibers.

In certain variations, the liner includes a polymer. The creating the liner includes a process selected from the group consisting of: additive manufacturing, mandrel formation, blow molding, and rotational molding.

In other variations, the method further includes removing the liner after cross-linking or solidifying the body precursor.

In still other variations, the method further includes placing an internal gear set prior to the creating the liner. The creating the liner includes forming the liner around at least a portion of the internal gear set.

In some variations, the method further includes setting preloads for the internal gear set prior to the creating the liner. The setting the preloads includes placing the internal gear set on a mounting structure that includes a plurality of temporary mounts. Each mount is configured to engage a bore of the internal gear set.

In other variations, the creating the body precursor includes a filament winding process or a tape winding process.

In certain variations, the creating the body precursor includes, after the creating the liner, wrapping the liner in a dry reinforcing fiber fabric. The method also includes infusing the dry reinforcing fiber fabric with a resin to create the body precursor.

In certain other variations, the creating the body precursor includes forming two or more body portions in a compression molding process. The body portions are attached to the outer surface of the liner.

In still other variations, the liner includes a shape memory polymer (SMP). The creating the liner includes disposing the SMP around at least a portion of the internal gear set to form the liner. The creating the body precursor includes a filament winding process or a tape winding process. The body precursor includes a unibody structure free of seams or joints.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3A:
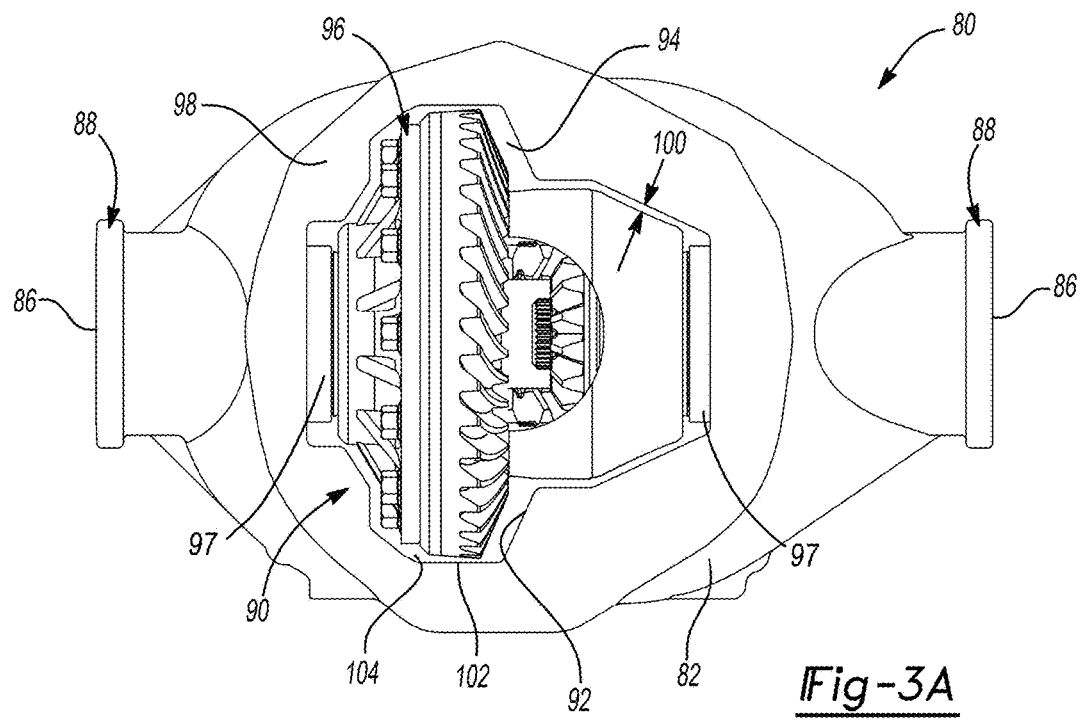
Figure 3B:
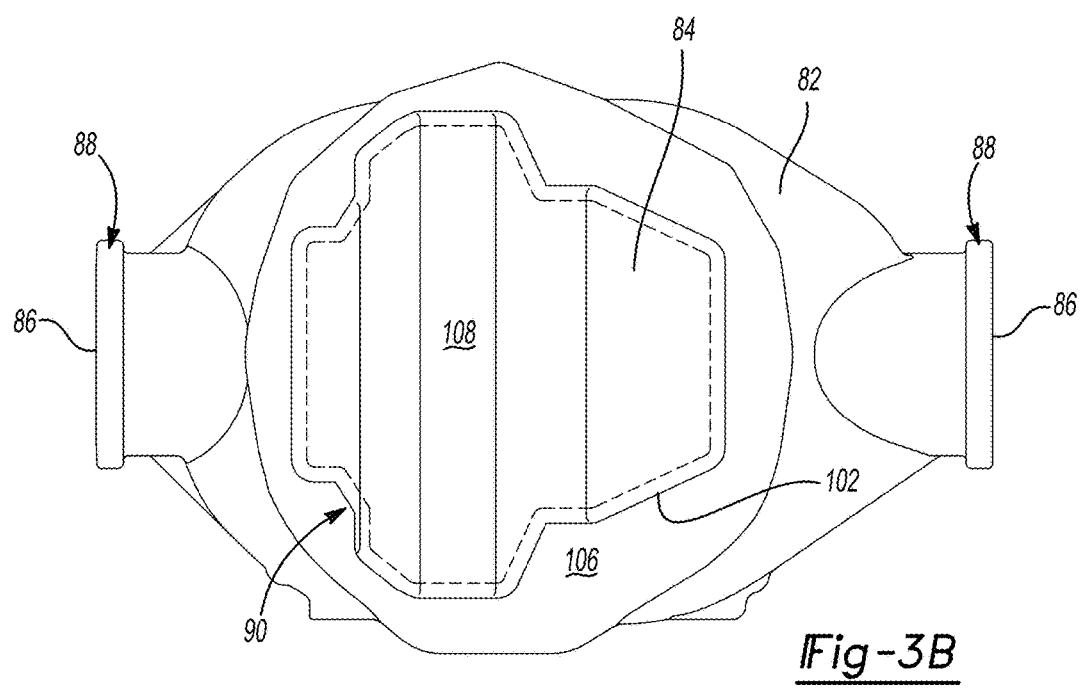
Figure 4:
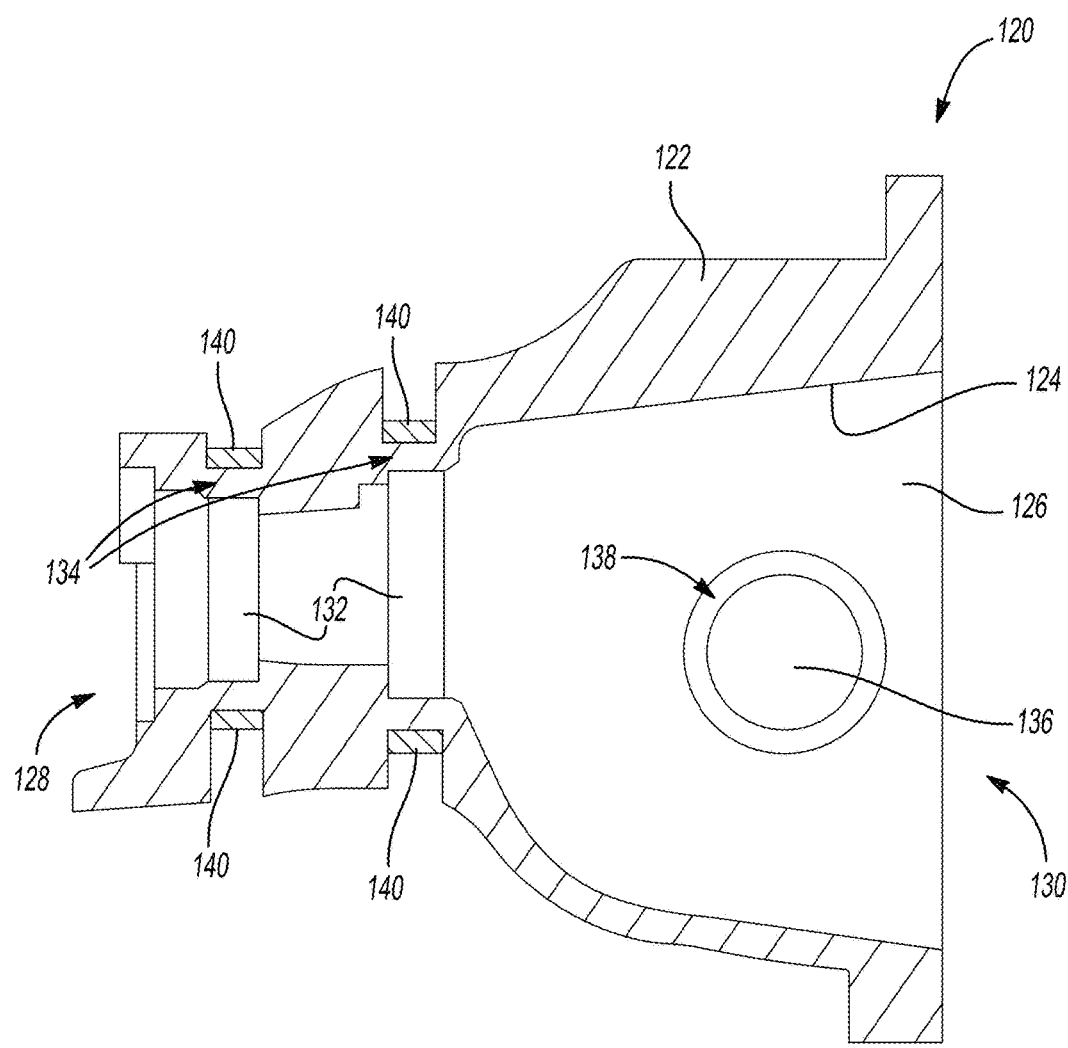
Figure 5A:
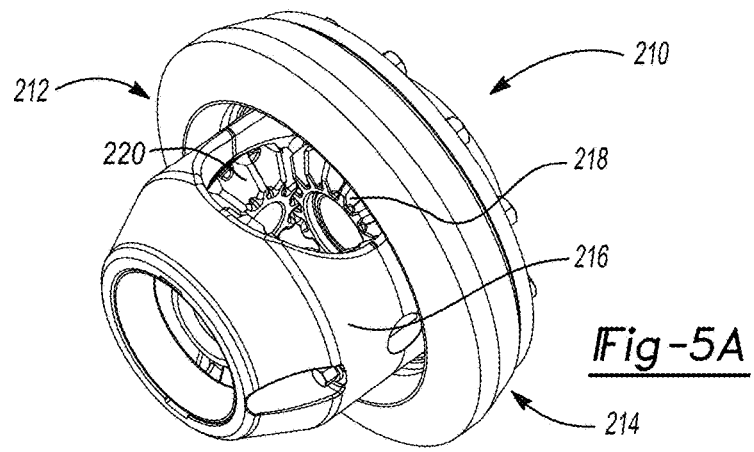
Figure 5B:
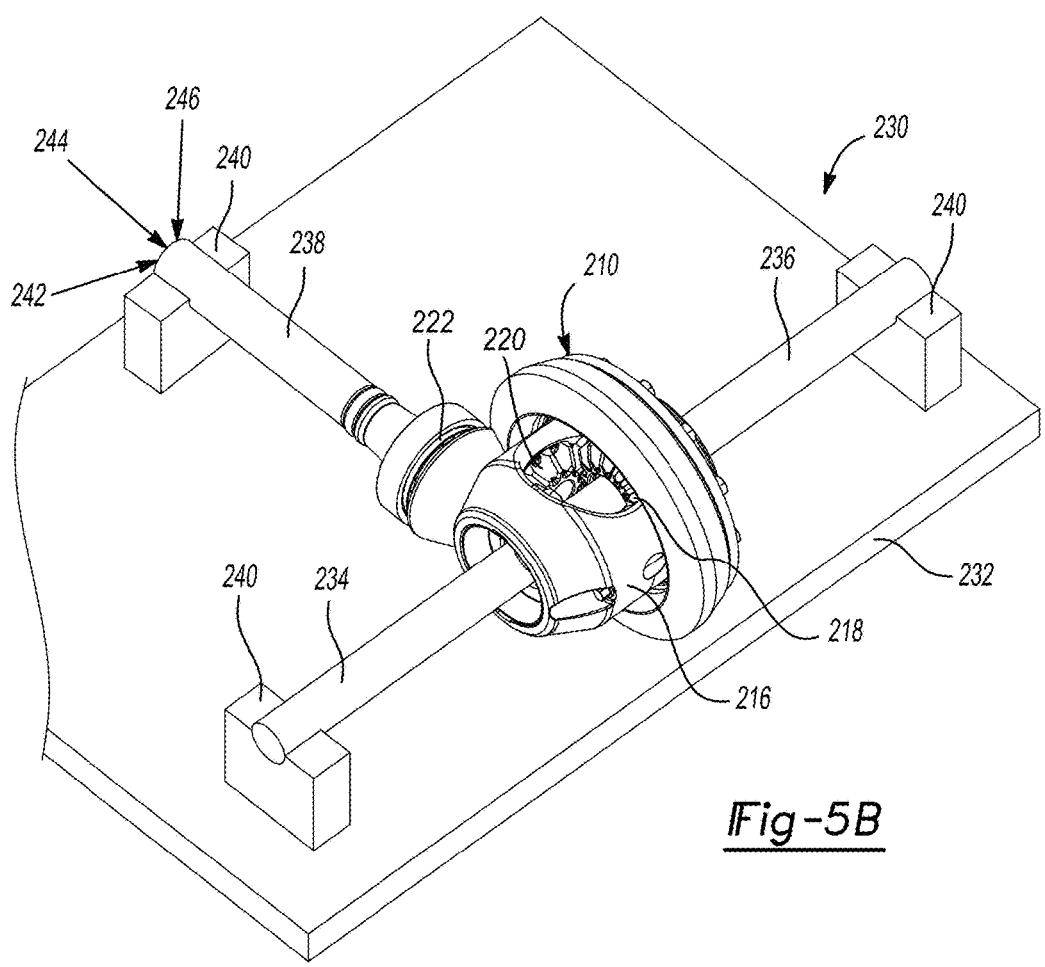
Figure 5C:
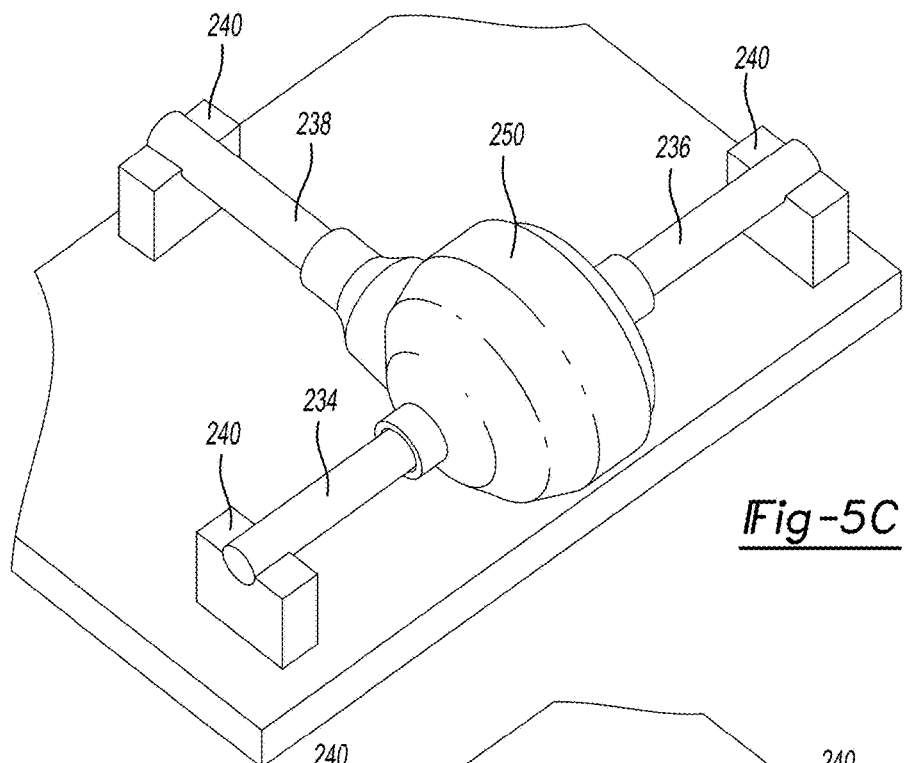
Figure 5D:
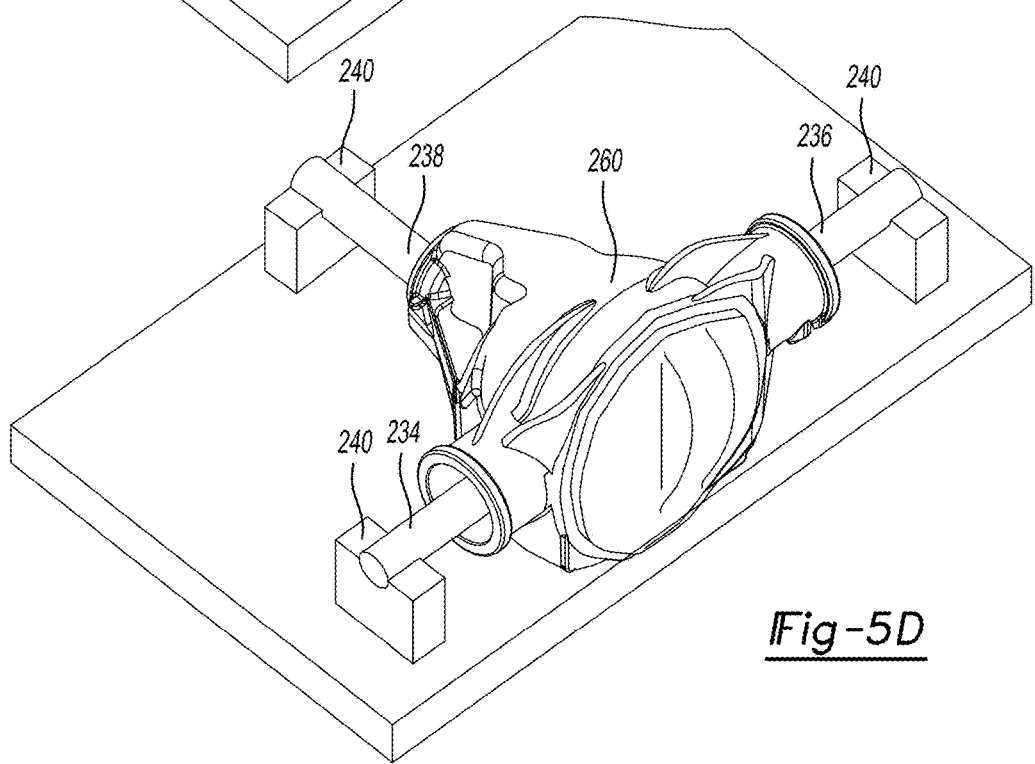
Figure 5E:
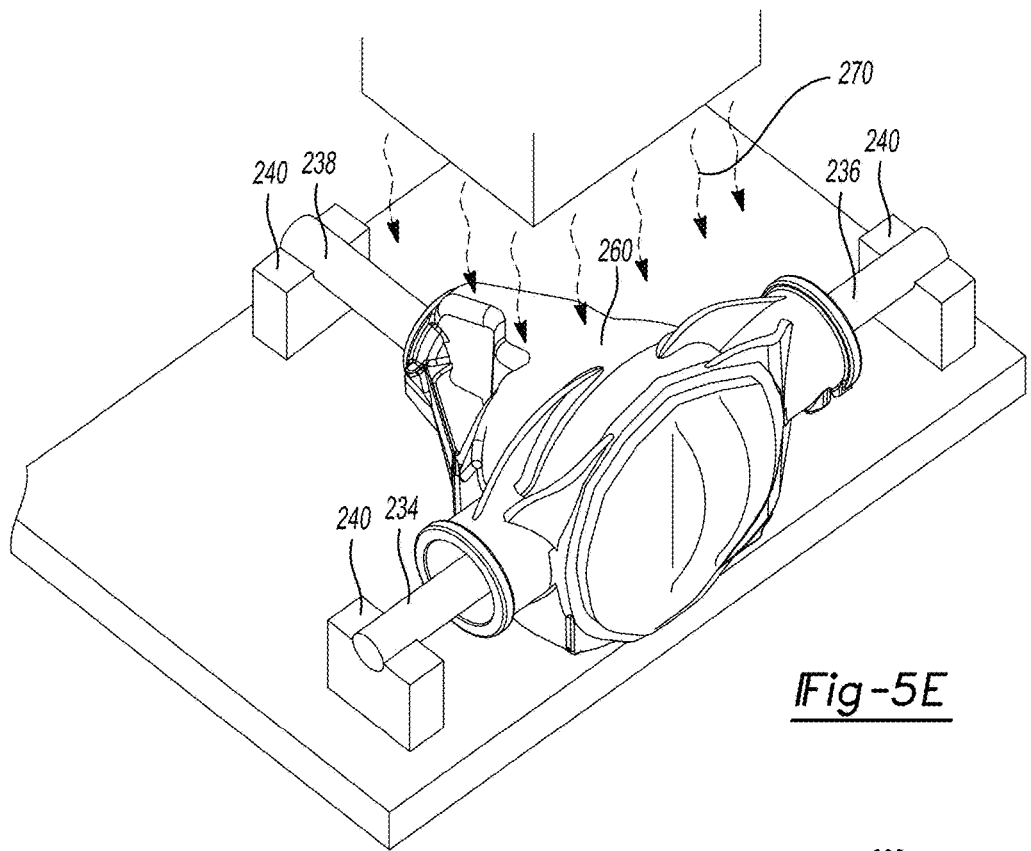
Figure 5F:
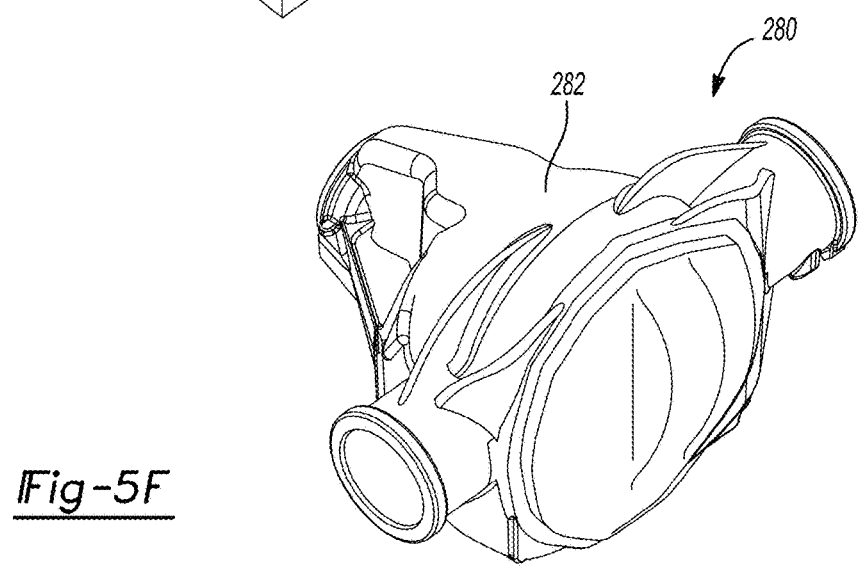

FIGS. 1A-1B show a unibody axle housing according to certain aspects of the present disclosure. FIG. 1A is a perspective view of the axle housing including an internal liner; FIG. 1B is a perspective view of the internal liner of the axle housing;

FIG. 2 shows a perspective view of another unibody axle housing according to certain aspects of the present disclosure;

FIGS. 3A-3B show a two-piece axle housing according to certain aspects of the present disclosure. FIG. 3A is a top view of the two-piece axle housing with a cover removed to show an internal gear set; FIG. 3B is a top view of the axle housing with the cover attached to enclose the internal gear assembly in the axle housing;

FIG. 4 is a cross sectional view of another axle housing assembly having localized thermal expansion control according to certain aspects of the present disclosure; and FIGS. 5A-5F show a method of manufacturing an axle assembly according to certain aspects of the present disclosure. FIG. 5A shows an internal gear assembly; FIG. 5B shows an internal gear assembly on a mounting structure; FIG. 5C shows a liner disposed around the internal gear assembly; FIG. 5D shows a polymeric composite body precursor disposed around the liner; FIG. 5E shows heat applied to the polymeric composite body precursor; and FIG. 5F shows a composite axle housing.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

An axle housing assembly generally includes an internal gear set, an axle housing or casing, and axle tubes. Example axle housings styles include a Salisbury axle housing, a banjo axle housing, and a rear drive module, by way of non-limiting example. A traditional Salisbury axle housing includes a cast center section, a cover, and press-in axle tubes. A banjo axle housing includes a cast center section with integrated axle tubes and a cover. The cover can be removed to enable access to the internal gear set. It may be necessary to access the internal gear set, for example, to install the internal gear set, set the gear preloads, perform maintenance, or to replace the internal gear set. A two-piece axle housing design may generally be referred to as a "drop-in housing" because the entire gear set is placed into the axle housing through a differential opening when the cover is removed. A pinion gear and pinion bearings are placed into the housing first. Side bearings, a differential gear set, and a ring gear are concurrently dropped into the housing. This usually requires applying a large outward force to opposing sides of the differential opening to open the housing to enable the side gears to seat into journal bearings. The cover is then bolted on to close the housing and contain the internal gear set.

A rear drive module is an example of a "tip-in housing." In a tip-in housing, pinion gears and pinion bearings are placed into the housing first. Next, side bearings, differential gear sets, and a ring gear are tipped into the housing simultaneously. This process eliminates the need for journal bearings to be machined within the axle housing as well as their associated bearing cups and bolts. After insertion of the side bearings, the side bearing cups are placed. Last, the housing cover is bolted onto the center section to contain the internal gear set.

The components of the internal gear set are generally made from steel. Axle housings are typically made of a metal, such as cast iron or aluminum. Cast iron axle housings are heavy, and reduction in weight could contribute to improved fuel economy. Fuel economy may be improved through use of lower density materials, such as aluminum, for the axle housing. However, aluminum has relatively high coefficients of thermal expansion compared to steel. Thus, an aluminum axle housing expands at a higher rate than a steel internal gear assembly, for example, in a region surrounding the pinion bearings. The difference in thermal expansion results in reduced engagement of the gears, decreased performance, and increased NVH.

Some vehicles may use axle housing assemblies that do not undergo maintenance. If the axle housing assembly is deemed damaged, it is replaced with a new axle housing assembly that includes an axle housing and an internal gear set. Because the entire axle housing assembly is replaced when it is damaged, there is no need to access the internal gear assembly after installation. Thus, it is possible to use an axle housing without a removable cover. Such axle housings may include a single-piece or unibody structure free of joints or seams within the body itself. Because the internal gear assembly is inaccessible in a unibody axle housing assembly, there is a need for a high level of repeatability in manufacturing. In certain aspects, the present disclosure provides a composite unibody, while in other aspects, multiple piece axle housings and assemblies are provided. The present disclosure also contemplates methods of manufacturing composite axle housings.

In various aspects, the present disclosure provides a unibody composite axle housing or casing for an axle housing assembly including an internal gear set. Polymeric composite materials are high-strength and light-weight. The composite material includes a suitable polymer and plurality of suitable reinforcing fibers. For example, carbon fiber reinforced polymer (CFRP) composite materials have a tensile modulus that is greater than or equal to about 2 and less than or equal to about 8 times higher than that of aluminum. CFRPs have an ultimate tensile strength of nearly 12.5 times higher than the yield strength of aluminum and a density of nearly half that of aluminum. The relatively low density of composite when compared to metallic materials enables weight reduction when composites are used in vehicle components, which may result in improved fuel economy.

Examples of suitable polymers for the composite material include, but are not limited to a thermoset resin, a thermoplastic resin, an elastomer and combinations thereof. More specifically polymers may include, but are not limited to epoxies, phenolics, vinylesters, bismaleimides, polyether ether ketone (PEEK), polyamides, polyimides and polyamideimides. Examples of suitable reinforcing fibers include carbon fibers, glass fibers, aramid fibers, polyethylene fibers, organic fibers, metallic fibers, and combinations thereof, by way of non-limiting example.

An axle housing may be a single-piece or unibody structure when the internal gear set does not need to be accessible after installation. The use of a unibody structure results in part reduction as the cover, seal, and fasteners are eliminated when compared to a two-piece axle housing. The unibody structure is also advantageous in eliminating a gear lubrication leakage that may result from a poor seal in a two-piece design.

Referring to FIGS. 1A-1B, an exemplary unibody axle housing 10 according to certain aspects of the present disclosure is shown. With reference to FIG. 1A, the unibody axle housing 10 includes a polymeric composite body 12. The polymeric composite body 12 includes a polymer and a plurality of reinforcing fibers. The polymeric composite body 12 may have a modulus of greater than or equal to about 10 GPa. The polymeric composite body 12 defines an inner surface 14 and an outer surface 16. The inner surface 14 defines an interior cavity 18. The interior cavity 18 is configured to receive or contain an internal gear assembly (not shown). A wall thickness extending between the inner surface 14 and the outer surface 16 may be greater than or equal to about 2 mm, optionally greater than or equal to about 5 mm, optionally greater than or equal to about 50 mm.

The polymeric composite body 12 extends between a first end 20 and a second end 22. The first end 20 includes a pinion bearing bore 24 and a pinion bearing region 26 disposed around the pinion bearing bore 24. The polymeric composite body 12 also includes opposing side bores 28 and respective side bore regions 30 disposed around each side bore 28. Each of the bearing bores 24, 28 is configured to receive a respective bearing of the internal gear assembly. The bearing may be directly disposed in the bore and in contact with a surface defining the bore 24, 28. Alternatively, the bearing may be indirectly disposed in the bore 24, 28 such that there is another material disposed between the bearing and the bore 24, 28. The polymeric composite body 12 may also include a flange 32 at the first end 20. The flange 32 is configured to receive axle tubes (not shown).

The unibody composite axle housing 10 may optionally include an internal shell or liner 40, as best shown in FIG. 1B. The polymeric composite body 12 is disposed at least partially around the liner 40. The liner 40 may be sized and shaped to complement the inner surface 14 of the polymeric composite body 12. The liner 40 includes a first end 42 and a second end 44 that are disposed at respective first and second ends 20, 22 of the polymeric composite body 12. The liner 40 includes a pinion bearing bore 46 at the first end 42 and a pinion bearing region 48 disposed around the pinion bearing bore 46. The liner 40 also includes opposing side bores 50 and respective side bore regions 52 disposed around the side bores 50. The liner 40 may include one or more connecting walls 54 in a connecting region 55 extending between the bores 46, 50. The liner 40 may include a flange 56 similar to the flange 32 of the polymeric composite body 12.

The pinion bore region 48 has a first thickness, the side bore region 52 has a second thickness, and the connecting region 55 has a third thickness. In some embodiments, the first, second, and third thicknesses may be the equal. For example, the first, second, and third thicknesses may be less than or equal to about 5 mm. In some embodiments, the first and second thicknesses may be the same and the third thickness may be distinct. For example, the first and second thicknesses may be less than or equal to about 5 mm, optionally less than or equal to about 1 mm. The third thickness may be less than or equal to about 1 mm. In other embodiments, each of the first, second, and third thicknesses may be distinct. For example, the first thickness may be less than or equal to about 5 mm, optionally less than or equal to about 1 mm. The second thickness may be less than or equal to about 5 mm, optionally less than or equal to about 1 mm. The third thickness less than or equal to about 1 mm.

The liner may be metallic or polymeric. Suitable metals include aluminum (Al), magnesium (Mg), iron (Fe), steel, and combinations thereof. Suitable polymers may include polyimides, polyamides (e.g., nylon $((C_{12}H_{22}N_2O_2)_n)$), high temperature polymers, and water-soluble polymers. Water-soluble polymers may include: polyvinyl acetate $((C_4H_6O_2)_n)$, poly acrylamide $(C_3H_5NO)_n$, polyacrylic acid (PAA) $((C_3H_4O_2)_n)$ and its derivatives, polyethylene oxide (PEO) $(C_{2n}H_{4n+2}O_{n+1})$, and polyhydroxyethylmethacrylate (PHEMA) $((C_6H_{10}O_3)_n)$.

The liner 40 may have a variety of different geometries. For example, the liner can be a continuous structure shaped and sized to complement the inner surface 14 of the polymeric composite body 12, as shown in FIG. 1B. In another example, the liner may have a multi-piece structure, such as distinct cylindrical liners at each bearing region 26, 30 of the polymeric composite body 12 (not shown). In yet another example, the liner may include cylindrical liners at each bearing region 26, 30 and a plurality of connecting walls or slats extending between the cylindrical liners (not shown).

The use of a liner 40 is particularly advantageous when surface quality is important. For example, an aluminum liner 40 may have a surface roughness of greater than or equal to about 0.1 μm and less than or equal to about 25 μm. A low surface roughness is useful for insertion of the press fit bearings into the respective bores 46, 50. Although the axle housing 10 of FIG. 1A includes a liner, it should be understood that an axle housing according to certain aspects of the present disclosure may be provided without a liner.

Returning to FIG. 1A, thermal expansion of the polymeric composite body can be strategically controlled. For example, it is advantageous the thermal expansion of the polymeric composite body 12 at the pinion bearing region 26 to match the thermal expansion of the pinion bearing (not shown). For example, when the pinion bearing is steel and the axle housing 10 does not include a liner at the bearing region 26, the coefficient of thermal expansion of the pinion bearing region 26 may be greater than or equal to about $10 \times 10^{-6}/°$ C. to less than or equal to about $14 \times 10^{-6}/°$ C., optionally greater than or equal to about $10 \times 10^{-6}/°$ C. to less than or equal to about $14 \times 10^{-6}/°$ C., optionally greater than or equal to about $10 \times 10^{-6}/°$ C. to less than or equal to about $12 \times 10^{-6}/°$ C. When the pinion bearing region 26 includes the liner 12 that has a high coefficient of thermal expansion (e.g., aluminum (Al)), the coefficient of thermal expansion of the polymeric composite body 12 is desirably lower so that the total of thermal expansion of the pinion bearing region 26 is less than or equal to that of steel to constrain the liner material at the pinion bearing region 26. For example, the coefficient of thermal expansion of the polymeric composite body 12 may be less than or equal to about than $12 \times 10^{-6}/°$ C., optionally less than or equal to about $10 \times 10^{-6}/°$ C. Thermal expansion may be controlled by fiber orientation, fiber volume fraction, or selection of fiber material, by way of non-limiting example.

Referring now to FIG. 2, another exemplary axle housing 60 is shown. The axle housing 60 may be a Salisbury axle housing. The axle housing 60 includes a polymeric composite body 62 extending between a first end 64 and a second end 66. The polymeric composite body 62 includes a pinion bore 68 and respective pinion bore region 70 disposed at the first end 64. The polymeric composite body 62 also includes opposing side bores 72 and respective side bore regions 74. The polymeric composite body 62 is configured to receive axle tubes at the side bores 72. The unibody axle housing 60 may also include a liner or shell (not shown) similar to the liner 40 of FIG. 1B that is sized and shaped to complement at least a portion of an inner surface of the unibody axle housing 60. Thermal expansion control, as discussed in connection with FIG. 1A, can be used in the pinion bore region 70.

In other aspects, the present disclosure provides a two-piece composite axle housing for an axle housing assembly including an internal gear set. Referring now to FIGS. 3A-3B, a two-piece composite axle housing assembly 80 is shown. The axle housing assembly 80 includes a center section 82 and a cover 84. Both the center section 82 and the cover 84 are formed from polymeric composite. The center section 82 includes a pinion bearing bore and a pinion bearing region at a first end (not shown) similar to the pinion bearing bore 68 and the pinion bearing region of the axle housing 70 of FIG. 2. The center section 82 also includes side bearing bores 86 and respective side bearing regions 88. The cover is disposed at a second end 90 of the center section 82 similar to the second end 66 of the polymeric composite body 62 of the axle housing 60 of FIG. 2.

As best shown in FIG. 3A, the center section 82 includes an inner surface 92 that defines an interior region 94. The interior region 94 is configured to house or retain an internal gear set 96 including side bearings 97. The center section includes a wall 98 that at least partially surrounds the internal gear set 96. A spacing or gap 100 between the inner surface 92 and the internal gear set 96 may be variable. The spacing 100 may be less than or equal to about 100 mm, optionally less than or equal to about 25 mm, optionally less than or equal to about 5 mm, optionally less than or equal to about 1 mm. In some examples that spacing varies between about 0.5 mm and about 25 mm. In some embodiments, the wall 98 has a substantially uniform spacing 100 from the internal gear set 96.

The center section 82 includes a perimeter 102 defining a differential opening 104. As shown in FIG. 3B, the cover 84 may be pressed into the differential opening 104 so that a top surface 106 of the center section 82 is flush with a top surface 108 of the cover 84. A seal or gasket (not shown) may be disposed between the center section 82 and the cover 84 and may engage the center section 82 and the cover 84 to prevent gear lubricant leakage. Fasteners (not shown) may also be used to retain the cover 84 in the differential opening 104.

In still other aspects, the present disclosure provides an axle housing assembly having localized thermal expansion control. Referring to FIG. 4, an axle housing 120 having localized thermal expansion control is shown. The axle housing 120 includes a metallic body 122, which may be aluminum (Al). The axle housing 120 includes an inner surface 124 defining an interior cavity 126 configured to retain an internal gear set (not shown). The axle housing 120 includes a first end 128 and a second end 130. The first end includes pinion bores 132 at the first end 128. Respective pinion bore regions 134 are disposed around the pinion bores 132. The axle housing also includes opposing side bores 136 and side bore regions 138.

Localized thermal expansion control can be provided by use of a second material, such as a polymeric composite, having a lower coefficient of thermal expansion than the material of the metallic body 122. For example in FIG. 4, carbon fiber composite wrappings 140 are provided around the pinion bearing regions 134 to constrain thermal expansion of the aluminum body 122.

In various aspects, the present disclosure provides a method of manufacturing a unibody axle housing assembly for a vehicle. The method is shown in FIGS. 5A-5F. The method generally includes obtaining an internal gear assembly, optionally externally setting preloads, forming a liner around the internal gear assembly, forming a polymeric composite body precursor, cross-linking or curing the polymeric composite body precursor to form the unibody composite axle housing, and optionally removing the liner. Each of the steps is discussed in greater detail below.

Referring to FIG. 5A, an internal gear set 210 for a vehicle is provided. The internal gear set 210 generally includes a metal material like steel. The internal gear set 210 includes a first end 212 and a second end 214. The internal gear set 210 includes components such as a differential gear set 216, a ring gear 218, a pinion gear 220, and one or more pinion bearings 222 (FIG. 5B).

With reference to FIG. 5B, the internal gear set 210 may optionally be aligned and preloads may be set prior to installation of the gear set 210 in an axle housing. In other methods, the gears may be aligned and preloads set after placing the internal gear set 210 into a liner. In one example, preloads are set by using a mounting structure 230. The entire mounting structure is placed on an anti-vibration slab 232. The pinion gear 220 includes the pinion bearings 222 that are set to a desired axial preload. The differential gear set 216 and the ring gear 218 may be mounted on a temporary axle, which includes first and second temporary mounts 234, 236. The pinion gear 220 is held in place by a third temporary mount 238. Thus, the pinion gear 220 is engaged to the mounted ring gear 218. The external temporary mounts may have geometry to match the axle tubes that will subsequently be installed on the axle housing assembly. Each of the temporary mounts is placed on a block or support 240.

Force can be applied to any or all of the first, second, and third external temporary mounts 234, 236, 238 to control the level of engagement of the gears sets 216, 218, 220. For example, as shown on the third external temporary mount 238, force can be applied in the x-direction 242, the y-direction 244, or the z-direction 246 to set preloads. Thus, alignment and preload of the internal gear assembly 210 can be achieved with a high degree of repeatability prior to installation of the internal gear set 210 in an axle housing.

Referring now to FIG. 5C, a shell or liner 250 is formed around the internal gear set 210. The liner may be made of a polymer, such as a shape memory polymer (SMP) or a water-soluble polymer. The liner 250 may alternately be made from a metal, such as aluminum (Al), magnesium (Mg), iron (Fe), or steel, by way of non-limiting example. A polymeric liner may be formed in a variety of ways. For example, a polymeric liner may be manufactured in a process selected from the group consisting of: additive manufacturing, lay-up formation, mandrel formation, blow molding, or rotational molding. A metallic liner may be manufactured in metal-forming techniques, such as casting, machining, squeeze casting, by way of non-limiting example.

Additive manufacturing is a process by which a solid three-dimensional structure is built layer-by-layer, typically via a printing deposition process or where energy or heat is selectively applied to powder starting materials to solidify, fuse, or sinter and create a layer of solid material. Additive manufacturing is often referred to synonymously with three-dimensional printing. Non-limiting examples of additive manufacturing processes include fused deposition modeling and selective laser sintering with polymers, such as thermosets and thermoplastics; stereolithography, continuous liquid interface production technology, or other technologies that rely on UV curable polymers; fused deposition modeling with composite polymers; direct metal laser sintering, electron beam direct metal melting systems, blown powder directed energy deposition, wire-fed directed energy deposition, and liquid metal 3D printing system with "MagnetJet" technology with metals, such as aluminum alloys, titanium alloys, and alloyed steel. Moreover, a plurality of materials may be deposited at different locations of an object being built by a single machine.

A digital three-dimensional modeling system can be used to create a digital model of the structure to be formed. The physical structure can then be formed from the digital model by an additive manufacturing system. The system may include scanners that survey a structure's surface and develops a three-dimensional map of the structure's surface geometry. The system also provides a plurality of heads for depositing resins and/or fibers on structure surfaces. In various embodiments, the system is provided as a plurality of devices or as a single multi-functional device.

Additive manufacturing can be used to form the liner 250. In one example, the internal gear set 210 remains on the mounting structure 230 while the liner 250 is printed around the internal gear set 210 and the temporary mounts 234, 236, 238 of the mounting structure 230. In another example, a center section of the liner 250 including pinion bearing bores, side bearing bores, and a differential opening is printed. An internal gear set 210 is dropped or tipped in through a differential opening. The internal gear set is subsequently aligned and preloaded using the method described in FIG. 5B. An integral cover portion may be printed to close the differential opening.

In an alternative mandrel formation process for manufacturing the liner 250, the internal gear set 210 remains on the mounting structure 230 during formation of the liner 250. For example, the internal gear set 210 may be surrounded by SMP below its transition temperature to create a mandrel. The external temporary mounts 234, 236, 238 provide a template for the shape of axle tube, which will be subsequently attached. Next, the geometry of the mandrel is defined. In some examples, defining the geometry of the mandrel includes applying heat and pressure to the mandrel to form the liner 250. For example, the mandrel may be heated to a temperature greater than or equal to about 30° C. to less than or equal to about 220° C. A pressure of greater than or equal to about 5 kPa to less than or equal to about 500 kPa may be applied to the mandrel to form the liner 250. In other examples, the liner is formed without the application of heat or pressure. The liner 250 may conform to the shape of the internal gear set 210.

Blow molding may alternatively be used to form the liner 250. A blow molding process requires a mold, which may be metal, having internal geometry to complement the desired outer surface geometry of the liner 250. A polymeric preform is placed into the mold. As heat is applied and air is blown into the preform, a core rod stretches the preform and the preform takes final shape of the mold. The preform is cooled or solidified to form a solid shell. Next, pinion gear and side gear bores are machined into the preform. A cap is cut off from the preform to enable insertion of the internal gear set 210. The internal gear set 210 is dropped or tipped into place. The internal gear set 210 may be aligned and preloaded, for example, by using the method described in conjunction with FIG. 5B, or by traditional preloading methods. The cap is returned to the preform to enclose the gear set and form the liner 250.

Rotational molding may alternatively be used to create the liner 250. Rotational molding requires a two-part mold having a lower cavity and an upper cavity. The mold should have an internal geometry to complement the desired outer surface geometry of the liner 250. The mold is filled with polymer pellets and the internal gear set 210 is inserted. The internal gear set may be suspended on the mounting structure 230 as described in conjunction with FIG. 5B. The internal gear set 210 remains stationary while the heated mold spins. As the polymer pellets are heated, a shell is created along the inner surface of the mold. The mold is cooled to form the liner 250 and opened to remove the liner 250.

Referring now to FIGS. 5D-5E, a polymeric composite body precursor 260 is manufactured and then heat 270 is applied to cross-link or cure the polymeric composite body precursor 260. Cross-linking or curing is necessary when thermoset matrices are used. However, when thermoplastic matrices are used, the heating step of FIG. 5E is omitted and the polymeric composite body precursor 260 is instead solidified, cooled, or crystallized. The polymeric composite body may be formed directly onto an outer surface of the liner so that an inner surface of the polymeric composite body precursor 260 conforms to the outer surface of the liner 250. Thus, the polymeric composite body precursor 260 can be manufactured with a high degree of precision. The polymeric composite body precursor 260 may be manufactured in a composite forming process such as filament winding, tape winding, or dry carbon fiber wrapping with resin infusion, as described in greater detail below.

Polymeric composites can be formed by using strips of the composite precursor material, such as a fiber-based material (e.g., cloth or graphite tape). The composite may be formed with one or more layers, where each layer can be formed from contacting and/or overlapping strips of the fiber-based material. The fiber-based substrate material may also comprise a resin. The resin can be solidified (e.g., cross-linked, cured, or reacted) after the fiber-based material is applied to liner 250 and thus can serve to bond single or multiple layers together in the polymeric composite.

Various methods are typically employed for introducing resin to impregnated fiber-based substrate composite material systems: wet winding (or layup), pre-impregnating (referred to as "pre-preg"), and resin transfer molding. For wet winding, a dry fiber reinforcement material can be wetted with the resin as it is used, usually by submersion through a bath. For pre-impregnating (pre-preg), the resin is wetted into the fiber-based material in advance, and usually includes a step of partially curing the resin to have a viscous or tacky consistency, and then winding up the pre-preg fiber-based material for later use. Pre-preg composite material systems tend to use thermoset resin systems, which can be cured or reacted by elevated temperatures with cure or reaction times ranging from under one (1) hour to one (1) or more days (depending on the cure or reaction temperatures and methods), optionally about two (2) hours. However, some pre-preg materials may employ resins that cure or react with actinic radiation (e.g., ultraviolet radiation (UV)).

For resin transfer molding (RTM), dry fiber reinforcement material may be placed into a mold and resin may be infused into the mold under pressure (e.g., about 10 bar to about 40 bar for low pressure RTM and up to 200 bar for high pressure RTM). Injection molding techniques may also be used to introduce resin into the reinforcement material, particularly where the reinforcement material comprise discontinuous fibers. For example, a precursor comprising a resin and the reinforcement material may be injected or infused into a defined space or mold followed by solidification of the precursor to form the polymeric composite material. The term "injection molding" also includes reaction injection molding using at thermoset resin.

A reinforcement material may also be applied, for example, via filament winding, braiding or weaving near, within, and/or over the liner 250. The method may optionally comprise applying or introducing an uncured or unreacted resin composition into or onto the fiber-based reinforcement material. By applying, it is meant that the uncured or unreacted resin composition is wetted out onto the fiber-based material and thus may be coated on a surface of the fiber-based material or imbibed/impregnated into the reinforcement fiber-based material (for example, into the pores or openings within the reinforcement fiber-based material). After the resin is introduced to the regions having the reinforcement material, followed by solidifying (e.g., cross-linking, curing, or reacting) to form the polymeric composite. Pre-preg fiber-based material may be applied via filament winding, braiding or weaving as well.

With reference to FIG. 5F, a composite axle housing 280 including a polymeric composite body 282 is shown. The liner 250 (shown in FIG. 5C) may optionally be removed. For example, when the liner is SMP, it may be heated above the transition temperature of the SMP for removal. The removed liner material can be reused for subsequent temporary liners. In another example, the liner 250 can be etched away by acid or in water, in the case of a water-soluble liner.

In still other aspects, a method of manufacturing a multiple-piece axle housing is provided. The method may be similar to the method described in FIGS. 5A-5F for manufacturing a unibody axle housing. However, additional methods may be used to form a polymeric composite body precursor and attach it to a liner. For example, upper and lower halves of a polymeric composite body can be compression molded separately. The upper and lower halves may be attached to the liner, for example by adhesive bonding or mechanical fastening, with the polymeric composite body encapsulating the liner and internal gear set. The polymeric composite body may also be molded in more than two pieces, for example, a lower half, an upper half having a differential opening, and a cover.

A cover may alternatively be formed as an additional step. For example, when the methods discussed in conjunction with FIG. 5D are used to manufacture the polymeric composite body precursor, a cover can be cut or machined out of the body after cross-linking in FIG. 5E. A seal or gasket can be added to enclose an internal gear set.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle housing for a vehicle comprising:
   a polymeric composite body comprising a polymer and a plurality of reinforcing fibers, wherein the polymeric composite body has a modulus of greater than or equal to about 10 GPa and the polymeric composite body defines:
   an inner surface defining an interior cavity configured to receive an internal gear set comprising a bearing; and
   at least one bearing region having a bore and configured to be disposed around the bearing of the internal gear set; and a liner disposed adjacent to at least a portion of the inner surface of the polymeric composite body, the liner comprising a first thickness in the at least one bearing region and a second thickness in a connecting region, wherein the first thickness is greater than the second thickness.

2. The axle housing of claim 1, wherein the polymeric composite body has a coefficient of thermal expansion of less than or equal to about $14 \times 10^{-6}/°$ C. at the at least one bearing region.

3. The axle housing of claim 1, wherein the liner comprises a metal selected from a group consisting of aluminum (Al), magnesium (Mg), iron (Fe), steel, and combinations thereof.

4. The axle housing of claim 1, wherein the polymeric composite body defines a unitary structure free of seams or joints.

5. The axle housing of claim 1, wherein the polymeric composite body includes:
   a center section having a perimeter defining a differential opening;
   a gasket disposed around the perimeter; and
   a cover for the differential opening, wherein the cover engages the gasket to enclose the axle housing and create a liquid seal.

6. The axle housing of claim 1, wherein the axle housing is a Salisbury axle housing.

7. An axle housing assembly for a vehicle comprising:
   an internal gear set comprising a differential gear set, a pinion gear, a pinion bearing, a side bearing, and a ring gear;
   an axle housing comprising a polymeric composite body and a liner, the polymeric composite body comprising a polymer and a plurality of reinforcing fibers, wherein the polymeric composite body defines an inner surface defining an interior cavity and at least one bearing region having a bore, wherein the interior cavity retains the internal gear set, the liner disposed adjacent to at least a portion of the inner surface of the polymeric composite body, the liner comprising a first thickness in the at least one bearing region and a second thickness in a connecting region, wherein the first thickness is greater than the second thickness; and
   one or more axle tubes fixed to or integrally formed with the axle housing.

8. The axle housing of claim 7, wherein a gap is defined between an inner surface of the axle housing and an outer surface the internal gear set, and wherein the gap varies within the range of greater than or equal to about 0.5 mm to less than or equal to about 25 mm.

9. A method of manufacturing an axle housing assembly for a vehicle, the method comprising:
   creating a liner having an inner surface configured to receive an internal gear set of a vehicle and an outer surface, the liner comprising a first thickness in the at least one bearing region and a second thickness in a connecting region, wherein the first thickness is greater than the second thickness;
   creating a body precursor disposed around at least a portion of the outer surface of the liner, the body precursor comprising a polymer precursor and a plurality of reinforcing fibers; and creating a body by cross-linking or solidifying the polymer precursor to form a polymer, the body comprising the polymer and the plurality of reinforcing fibers, wherein:

the body has a modulus of greater than or equal to about 10 GPa; and the body comprises an inner surface defining an interior cavity, and at least one bearing region having a bore and being configured to be disposed around a bearing of the internal gear set.

10. The method of claim 9, wherein the liner comprises a polymer and the creating the liner comprises a process selected from the group consisting of: additive manufacturing, mandrel formation, blow molding, and rotational molding.

11. The method of claim 10, further comprising removing the liner after the cross-linking or solidifying the body precursor.

12. The method of claim 9, further comprising placing the internal gear set prior to the creating the liner, wherein the creating the liner comprises forming the liner around at least a portion of the internal gear set.

13. The method of claim 12, further comprising setting preloads for the internal gear set prior to the creating the liner, wherein setting preloads comprises placing the internal gear set on a mounting structure comprising a plurality of temporary mounts, wherein each mount is configured to engage a bore of the internal gear set.

14. The method of claim 9, wherein the creating the body precursor comprises a filament winding process or a tape winding process.

15. The method of claim 9, wherein the creating the body precursor comprises:

after creating the liner, wrapping the liner in a dry reinforcing fiber fabric; and infusing the dry reinforcing fiber fabric with a resin to create the body precursor.

16. The method of claim 9, wherein:

the creating the body precursor comprises forming two or more body portions in a compression molding process; and attaching the body portions to the outer surface of the liner.

17. The method of claim 9, wherein:

the liner comprises a shape memory polymer (SMP) and the creating the liner comprises disposing the SMP around at least a portion of the internal gear set to form the liner; and the creating the body precursor comprises a filament winding process or a tape winding process, wherein the body precursor comprises a unibody structure free of seams or joints.

* * * * *